(12) United States Patent
Yuan et al.

(10) Patent No.: US 9,234,764 B2
(45) Date of Patent: Jan. 12, 2016

(54) NAVIGATION SYSTEM INITIATING CONVERSATION WITH DRIVER

(71) Applicants: Alvin Yuan, Carson, CA (US); Pedram Vaghefinazari, Long Beach, CA (US)

(72) Inventors: Alvin Yuan, Carson, CA (US); Pedram Vaghefinazari, Long Beach, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/282,883

(22) Filed: May 20, 2014

(65) Prior Publication Data

US 2015/0338229 A1     Nov. 26, 2015

(51) Int. Cl.
  G01C 21/36     (2006.01)
  G01C 21/34     (2006.01)
  G06Q 30/06     (2012.01)
  G06Q 30/00     (2012.01)
  G06F 17/30     (2006.01)

(52) U.S. Cl.
  CPC .......... *G01C 21/3608* (2013.01); *G01C 21/343* (2013.01); *G01C 21/3629* (2013.01); *G01C 21/3641* (2013.01); *G01C 21/3644* (2013.01); *G01C 21/3679* (2013.01); *G06F 17/30241* (2013.01); *G06Q 30/01* (2013.01); *G06Q 30/06* (2013.01); *G06Q 30/0635* (2013.01); *G06Q 30/0641* (2013.01); *Y10S 707/99933* (2013.01)

(58) Field of Classification Search
  CPC ............. G01C 21/343; G01C 21/3629; G01C 21/3641; G01C 21/3644; G01C 21/3655; G01C 21/3679; G06F 17/30241; G06Q 30/01; G06Q 30/06; G06Q 30/0641; G06Q 30/0635; Y10S 707/99933

USPC ......... 701/532, 533, 539, 426, 427, 419, 461; 707/E17.018, 999.003; 340/995.16
  See application file for complete search history.

(56) References Cited

U.S. PATENT DOCUMENTS

| | | | |
|---|---|---|---|
| 4,346,364 A | 8/1982 | Takagi et al. | |
| 4,438,422 A | 3/1984 | Nojiri et al. | |
| 6,239,707 B1 | 5/2001 | Park | |
| 6,487,495 B1 * | 11/2002 | Gale et al. | 701/461 |
| 6,580,973 B2 | 6/2003 | Leivian et al. | |
| 6,909,947 B2 | 6/2005 | Douros et al. | |
| 6,925,425 B2 | 8/2005 | Remboski et al. | |
| 7,317,386 B2 | 1/2008 | Lengning et al. | |
| 7,333,007 B2 | 2/2008 | Lengning et al. | |
| 7,482,911 B2 | 1/2009 | Lengning et al. | |
| 7,565,230 B2 | 7/2009 | Gardner et al. | |
| 7,765,058 B2 | 7/2010 | Doering | |
| 7,783,426 B2 | 8/2010 | Kato et al. | |
| 7,894,986 B2 * | 2/2011 | Hegedus et al. | 701/426 |
| 8,207,837 B2 | 6/2012 | Lengning et al. | |

(Continued)

*Primary Examiner* — Russell Frejd
(74) *Attorney, Agent, or Firm* — Arent Fox LLP (57) ABSTRACT

An in-vehicle system determines whether conditions are satisfied, including a favorite order being known and a current time of day being within a time period of a predefined time day. If the conditions are satisfied, a conversation is initiated to ask whether the favorite order is desired. When a response indicates that the favorite order is desired, the favorite order is placed and navigation guidance is provided for driving to a vendor. In some embodiments, when second conditions are met, including a monitored portion of a current route matching a previously monitored portion of a route when an order was placed and a monitored time of day matching a previously monitored time of day, within a predefined time period, a speech conversation is initiated to ask whether the order is desired. If the driver indicates the desire for the order, the order is placed.

17 Claims, 6 Drawing Sheets

(56) References Cited

U.S. PATENT DOCUMENTS

| | | |
|---|---|---|
| 8,400,287 B2 | 3/2013 | Visconti et al. |
| 8,543,617 B2 * | 9/2013 | Hegedus et al. .............. 707/803 |
| 8,573,976 B2 | 11/2013 | Lecointre et al. |
| 8,583,511 B2 * | 11/2013 | Hendrickson ................ 705/26.8 |
| 8,595,014 B2 | 11/2013 | Rychlik |
| 8,600,754 B2 | 12/2013 | Rychlik |
| 2002/0151297 A1 | 10/2002 | Remboski et al. |
| 2006/0106615 A1 | 5/2006 | Tateisha et al. |
| 2006/0178943 A1 * | 8/2006 | Rollinson et al. ............... 705/26 |
| 2007/0159313 A1 | 7/2007 | Tamura |
| 2007/0179680 A1 | 8/2007 | Tamura |
| 2010/0198456 A1 | 8/2010 | Komori et al. |
| 2010/0274435 A1 | 10/2010 | Kondoh et al. |
| 2012/0190386 A1 * | 7/2012 | Anderson .................. 455/456.3 |
| 2013/0066750 A1 * | 3/2013 | Siddique et al. ............. 705/27.2 |
| 2013/0215116 A1 * | 8/2013 | Siddique et al. .............. 345/420 |
| 2013/0285855 A1 * | 10/2013 | Dupray et al. ................ 342/451 |
| 2014/0025540 A1 * | 1/2014 | Hendrickson ............. 705/26.81 |

* cited by examiner

NAVIGATION SYSTEM INITIATING CONVERSATION WITH DRIVER

BACKGROUND

1. Field of the Invention

The present teachings relate to in-vehicle systems and methods of using in-vehicle systems. In particular, the present teachings relate to an in-vehicle system and method that communicates with a driver via speech and recognizes and responds to the driver's speech.

2. Discussion of the Related Art

Current in-vehicle speech recognition (SR) systems in vehicles made by Honda and Acura, as well as vehicles made by other automakers, are operated by a driver using a hard switch located on a steering wheel. The switch may be referred to as a talk switch. Pressing the talk switch to activate the SR is sometimes referred to as "opening the microphone." After opening the microphone, audio volume may be decreased, fan speed may be lowered, and the SR system may be activated. The SR system may emit a beep sound, or a similar sound, to inform a user that the microphone is open and ready to receive an utterance of the user.

In order to make a verbal request or query using a current in-vehicle SR system, the user is required to press the talk switch to open the microphone and activate the SR system. However, if the user is otherwise occupied and fails to press the talk switch to make a request or query, beneficial or crucial information may not be provided to the user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In some embodiments, an in-vehicle system and a method performed by the in-vehicle system may be provided. The in-vehicle system may include a transceiver for communicating with a communication device capable of communicating via at least one network, a conversation initiator for initiating a speech conversation with a driver, a navigation component for tracking a route of a vehicle, including the in-vehicle system, and for providing navigation guidance, a speech recognition component for recognizing a speech utterance of the driver, and a route monitor for monitoring a portion of a current route of the vehicle and an associated time of day. The communication device may be a portable communication device in some embodiments. In other embodiments, the communication device may be a Telecommunications Unit (TCU) embedded in the vehicle. The embedded TCU may include a cellular phone. When the route monitor determines that the monitored portion of the current route of the vehicle matches a previously monitored portion of a route of the vehicle, before an order was placed with a vendor, and the monitored associated time of day matches, within a predefined time period, a previously monitored time of day associated with the previously monitored portion of the route, the conversation initiator initiates the speech conversation with the driver of the vehicle to ask the driver whether the driver desires to place the order again with the vendor. When a response of the driver indicates the desire to place the order again, then the in-vehicle system places the order again with the vendor.

In some embodiments, a method for an in-vehicle system to initiate a conversation with a driver of a vehicle is provided. When a predefined favorite order of the driver is known and a current time of day is within a predefined time period of a predefined time of day, the in-vehicle system initiates a speech conversation with the driver of the vehicle, having the in-vehicle system, to ask the driver whether the driver wants to order the predefined favorite order. If the in-vehicle system receives a verbal response from the driver indicating that the driver desires to order the predefined favorite order, then the in-vehicle system orders the predefined favorite order from a vendor, and provides navigation guidance to the driver for driving the vehicle to a location of the vendor.

In various embodiments, a route of a vehicle, when an order was placed, and an associated time of day may be saved. At a later time, when a current route of the vehicle matches the saved route of the vehicle and a current time of day matches the saved associated time of day, within a predefined period of time, the in-vehicle system may initiate a conversation to ask whether the order is to be placed again. When a response is received indicating that the order is to be placed again, the in-vehicle system may place the order again and may provide navigation guidance to the driver to drive to a location of a vendor.

BRIEF DESCRIPTION OF THE DRAWINGS

In order to describe the manner in which the above-recited features and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Overview

In various embodiments, an in-vehicle system may determine whether a favorite order of a driver is known and whether a current time of day is within a predefined time period of a predefined time of day. If the in-vehicle system determines that the predefined favorite order is known and the current time of day is within the predefined time period of the predefined time of day, then the in-vehicle system may initiate a speech conversation with the driver to ask the driver whether the driver desires to order the favorite order. Upon receiving a verbal response from the driver indicating the driver desires to order the predefined favorite order, the in-vehicle system may order the predefined favorite order from a vendor and may provide navigation guidance to the driver for driving a vehicle, including the in-vehicle system, to a location of the vendor.

In some embodiments, a route monitor determines whether a monitored portion of a current route of a vehicle matches a previously monitored portion of a route of the vehicle before an order was placed with a vendor by the in-vehicle system and whether a monitored associated time of day matches, within a predefined time period, a previously monitored time of day associated with the previously monitored portion of the route. When the route monitor determines that the monitored portion of the current route of the vehicle matches the previously monitored portion of the route of the vehicle before the order was placed with the vendor and determines that the monitored associated time of day matches, within the predefined time period, the previously monitored time of day associated with the previously monitored portion of the route, then a conversation initiator initiates a speech conversation with the driver to ask the driver whether the driver desires to place the order again with the vendor, and the in-vehicle system places the order of the vendor again when the driver responds to the initiated speech conversation by indicating the desire to place the order again.

Some embodiments include at least one processor and a memory having instructions for the at least one processor to perform a method. The method may include determining, by an in-vehicle system, whether a favorite order of a driver is known and whether a current time of day is within a predefined time period of a predefined time of day. When in-vehicle system determines that the favorite order of the driver is known and the current time of day is within the predefined time period of the predefined time of day, the in-vehicle system initiates a speech conversation with the driver to ask the driver whether the driver wants to order the favorite order, and receives a verbal response from driver indicating whether the driver desires to order the predefined order. When the verbal response of the driver indicates that the driver desires to order the predefined favorite order, ordering, by the in-vehicle system, the predefined favorite order from a vendor.

Exemplary Operating Environment

Figure 1:
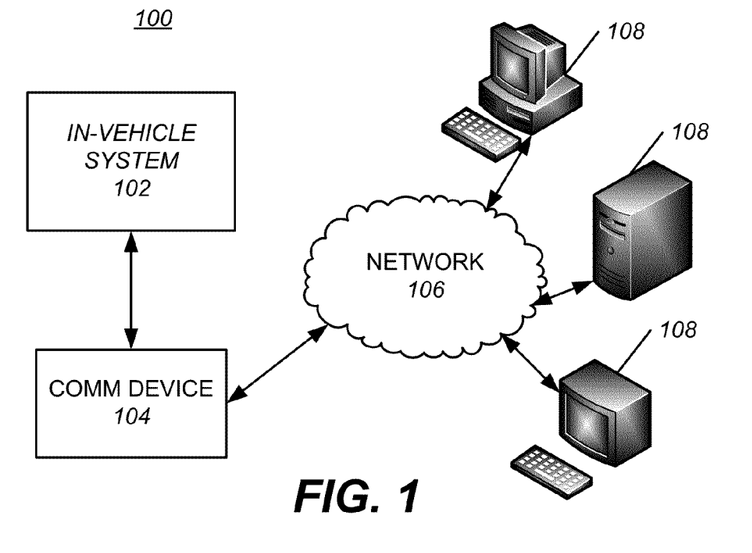
FIG. 1 illustrates an exemplary operating environment for various embodiments.

FIG. 1 illustrates an exemplary operating environment 100 for various embodiments. Operating environment 100 may include an in-vehicle system 102, a communication device 104, and a network 106. In some embodiments, exemplary operating environment 100 may include one or more computing devices 108.

In-vehicle device 102 may include a computing device, which may perform a number of functions, including, but not limited to, providing driving directions to drive to a destination as a vehicle, including in-vehicle device 102, is being driven, sending and receiving information to one or more other computing devices 108 via network 106, as well as other functions.

Communication device 104 may be a communication device, such as for example, a mobile phone, which may be a smart phone, as well as other types of communication devices. In some embodiments, communication device 104 may be a Telecommunications Unit (TCU) embedded in the vehicle. The embedded TCU may include a mobile, or cellular, phone. In some embodiments, in-vehicle system 102 may communicate with communication device 104 via short-range wireless transmissions, which may include the use of Bluetooth® (Bluetooth is a registered trademark of BLUETOOTH SIG, INC. of Kirkland, Wash.), wireless fidelity (WiFi) or other short-range wireless communication method. Communication device 104 may communicate with the one or more other computing devices 108 via network 106.

Network 106 may include one or more networks, including, but not limited to, a cellular phone network, a packet switching network, a public switched telephone network, a network of networks (such as the Internet), as well as other types of networks or combinations of the networks.

Computing devices 108 may include, but not be limited to, one or more servers, one or more personal computers, one or more laptop computers, or other types of computing devices.

Exemplary Embodiments

Figure 2:
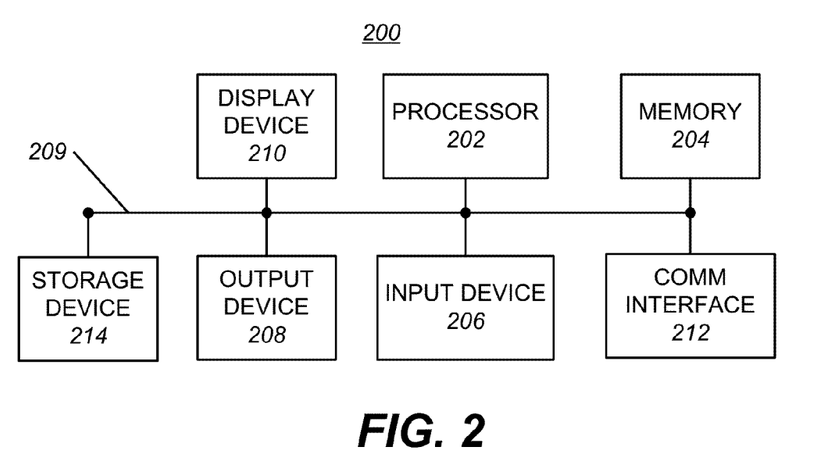
FIG. 2 is a block diagram of a computing device that may be used to implement an in-vehicle system in various embodiments.

FIG. 2 is a block diagram of a computing device 200, which may be employed in various embodiments to implement in-vehicle system 102. Computing device 200 may include a bus 209, a processor 202, a memory 204, a storage device 214, an output device 208, a display device 210, an input device 206, and a communication interface 212. Bus 209 may permit communication between processor 202 and components of computing device 200.

Bus 209 may connect processor 202 with memory 204, storage device 214, communication interface 212, input device 206, output device 208 and display device 210.

Processor 202 may include at least one conventional processor or microprocessor that interprets and executes instructions. Memory 204 may include a random access memory (RAM) or another type of dynamic storage device that may store information and instructions for execution by processor 202 and may store temporary variables or other intermediate information used during execution of instructions by processor 202. Memory 204 may also include a conventional ROM device or another type of static storage device that stores static information and instructions for processor 202. Dynamic memory and static memory are examples of machine-readable storage media. Machine-readable storage media do not include communication media, such as, for example, a modulated carrier wave, or signal, having information encoded therein. Storage device 214 may include a non-transient machine-readable storage medium for storing data and/or instructions for processor 202. Storage device 214 may include a magnetic disc, a flash RAM, an optical medium including, but not limited to, a compact disc (CD) or a digital video disc (DVD), as well as other non-transient computer storage media.

Input device 206 may include a microphone to allow computing device 200 to receive speech uttered by a user. In some embodiments, input device 206 may include other input devices, including, but not limited to a keyboard or a touch screen. Output device 208 may include a speaker for enabling computing device 200 to emit sounds, which may include, but not be limited to, generated speech and/or recorded speech. Display device 210 may include a display screen for displaying information to the user. Communication interface 212 may include a transceiver for communicating with one or more other devices.

Figure 3:
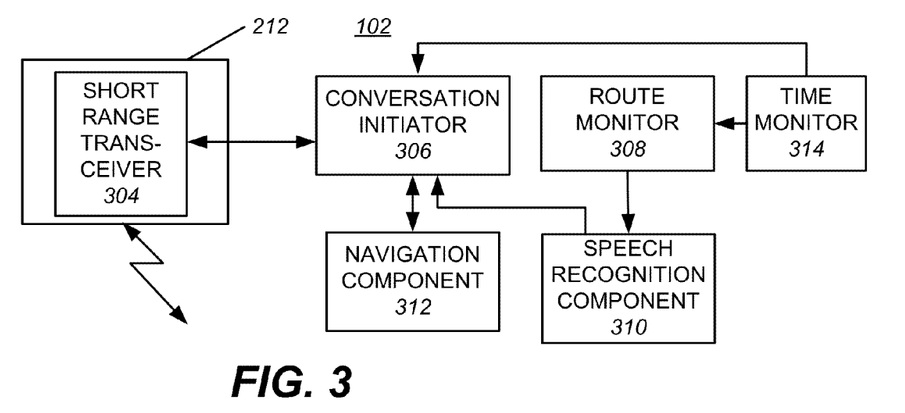
FIG. 3 is a functional block diagram illustrating functions in an exemplary embodiment of an in-vehicle system.

FIG. 3 is a functional block diagram illustrating exemplary communication interface 212 in more detail as well as other functional components of in-vehicle system 102. In some embodiments, communication interface 212 may include a short range transceiver 304. Short-range transceiver 304 may be a receiver for receiving short-range communications from a communication device, such as, for example, communication device 104.

In some implementations, short-range transceiver 304 may communicate with communication device 104 using Bluetooth®, wireless fidelity (WiFi) or other short-range method of communicating. In other implementations, communication interface 212 may include a transceiver for communicating over a network including, but not limited to, a mobile phone data network. In the other implementations, in-vehicle system 102 may communicate over network 106 directly instead of communicating with communication device 104, which may communicate via network 106.

As shown in FIG. 3, in-vehicle system 102 may also include a conversation initiator 306, a route monitor 308, a navigation component 312, a time monitor 314 and a speech recognition component 310, any or all of which may be implemented via a combination of hardware and software using components previously discussed with respect to FIG. 2, and/or an application specific integrated circuit (ASIC).

Conversation initiator 306 may initiate a speech conversation with a driver of a vehicle. Route monitor 308 may monitor a route of a vehicle controlled by the driver. Speech recognition component 310 may recognize speech utterances from the driver. Navigation component 312 may be a navigation system capable of guiding the driver to drive to a destination and tracking a location of the vehicle. Time monitor 314 may monitor a time of day in association with route monitor 308 monitoring the route of the vehicle.

Figure 4:
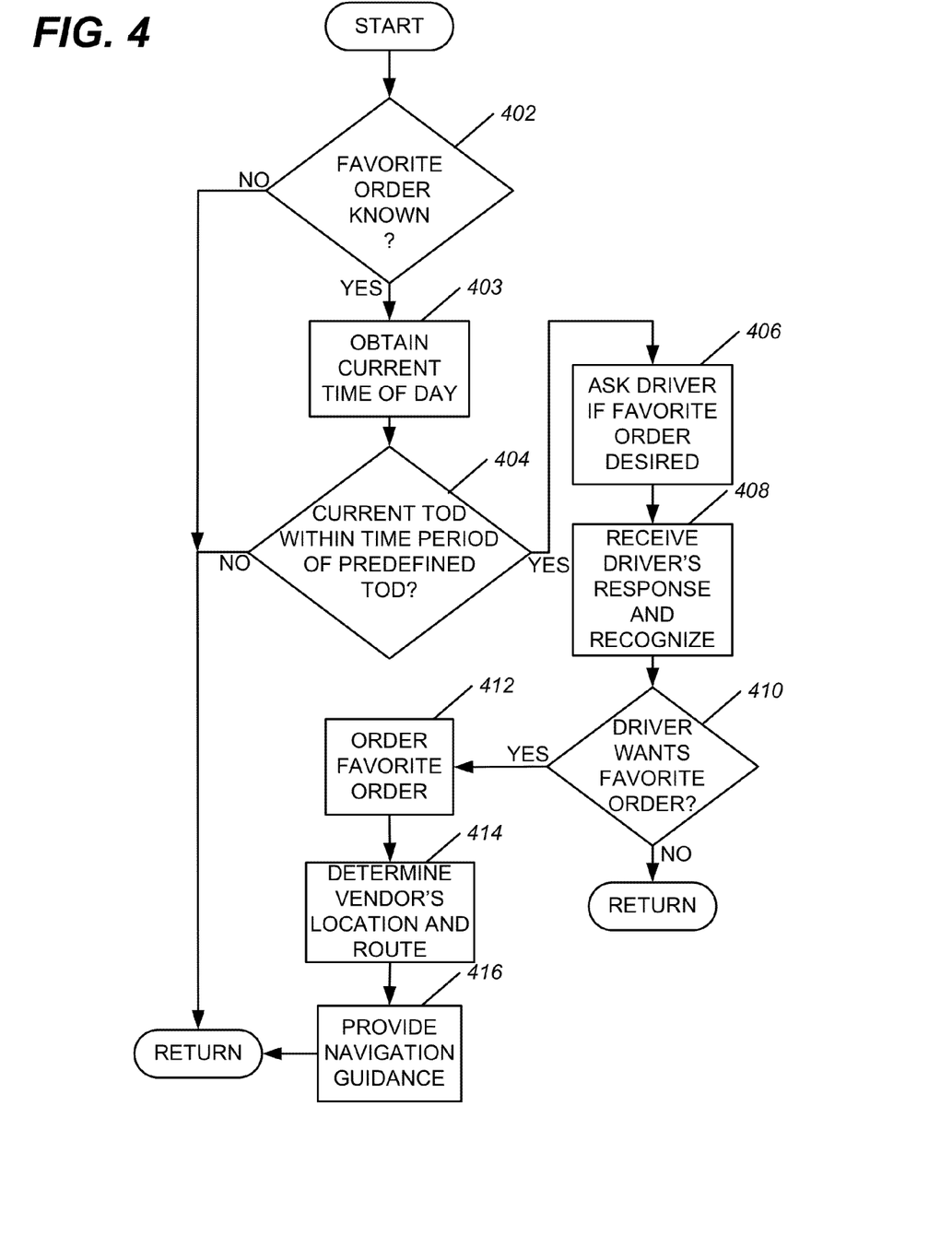
FIG. 4 is a flowchart of an exemplary process, which may be performed in some embodiments of an in-vehicle system.

FIG. 4 is a flowchart illustrating an exemplary process that may be performed by in-vehicle system 102 in various embodiments. When the process begins, conversation initiator 306 may determine whether a favorite order of the driver is known (act 402). If the favorite order is not known, then the process may be completed.

If the favorite order is known, then conversation initiator 306 may obtain a time of day from time monitor 314 (act 403) and may determine whether a current time of day is within a time period of a predefined time of day (act 404). The time period may be 30 minutes, 15 minutes, or another suitable time period. If the current time of day is not within the time period of the predefined time of day, then the process may be completed.

Otherwise, if the current time of day is within the time period of the predefined time of day, then conversation initiator 306 may initiate a conversation with the driver of the vehicle to ask the driver if the favorite order is desired (act 406). Speech recognition component 310 may receive an utterance, from the driver, regarding whether the driver desires the favorite order and may recognize the received utterance (act 408). Conversation initiator 306 may determine whether the response indicates the desire for the favorite order (act 410). If the response does not indicate the desire for the favorite order, then the process may be completed.

Otherwise, in-vehicle system 102 may place an order with a vendor for the favorite order (act 412). In some embodiments, in-vehicle system 102 may place the order by transmitting the order, via short rage transceiver 304, to communication device 104. Communication device 104 may then transmit the order to a computing device of the vendor from among computing devices 108 via network 106, which may include a wireless data network for communication devices. Network 106 may include may be connected to one or more other networks. In other embodiments, communication interface 212 may include a transceiver for communicating via the wireless data network directly, instead of through communication device 104.

Next, navigation component 312 may determine a location of the vendor (act 414) and may provide navigation guidance to the driver for driving to the location of the vendor (act 416). The process may then be completed.

In some embodiments, the vendor may be predefined. One example of how the driver may predefine the vendor and the favorite order may be through use of a website. In other embodiments, other methods of predefining the vendor and the favorite order may be employed.

Figure 5:
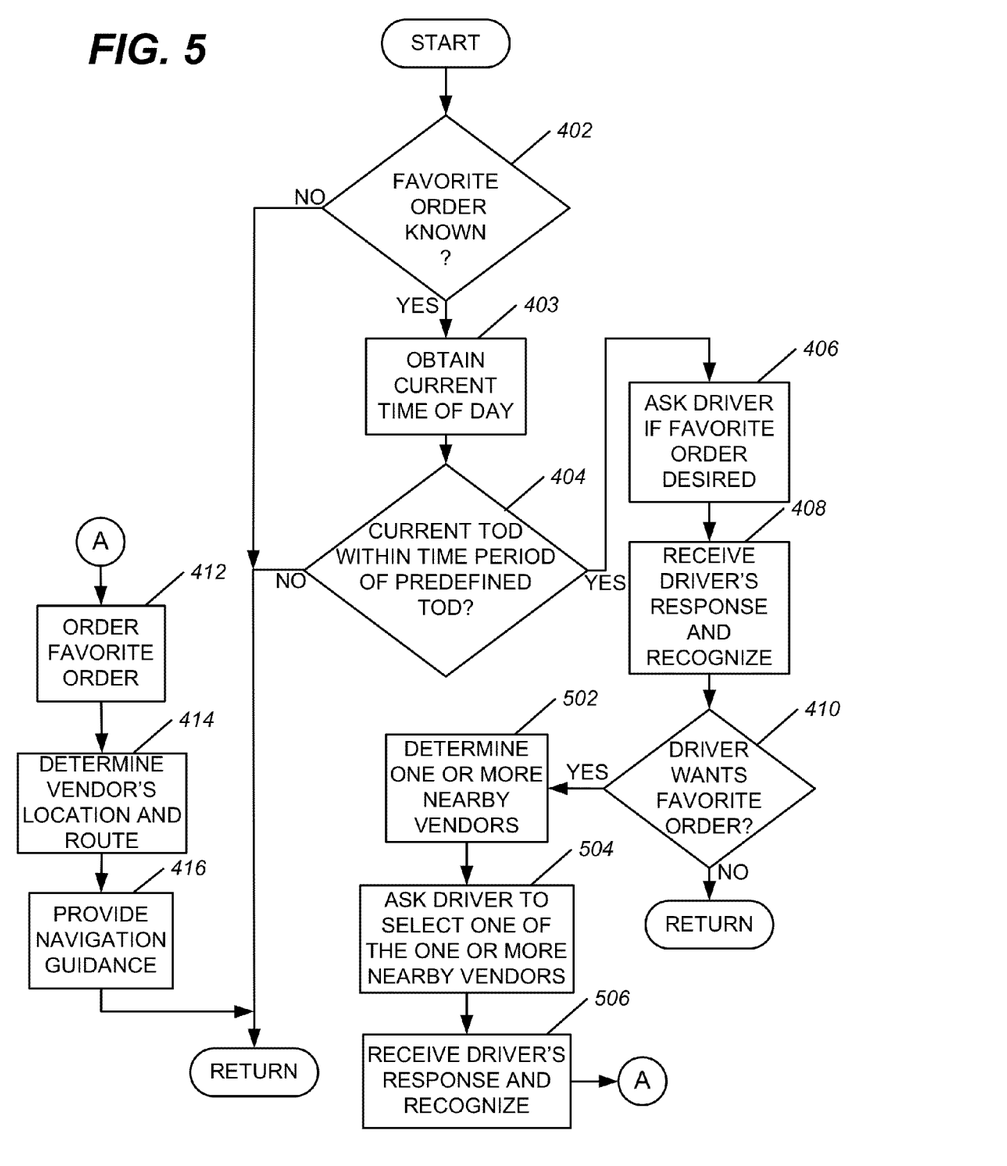
FIG. 5 is a flowchart of a modified version of the process illustrated by FIG. 4.

FIG. 5 is a flowchart illustrating the process of FIG. 4 with modifications for some embodiments in which the vendor is not predefined. Processes of FIG. 5 that are identical to those of FIG. 4 have identical reference numerals to those of FIG. 4.

After determining, in act 410, that the driver wants the favorite order, navigation component 312 may determine one or more nearby vendors from which the favorite order may be placed (act 502). Conversation initiator 306 may then continue the speech conversation by asking the driver to select one of the one or more nearby vendors (act 504). In-vehicle system 102 may list the one or more nearby vendors on a display screen for the driver or may list the one or more nearby vendors by generating speech or by use of recorded speech.

Speech recognition component 310 may receive a responsive utterance from the driver and may recognize a selected vendor from the responsive utterance (act 506). Acts 412-416 may then be performed as previously described with reference to FIG. 4. The process may then be completed. In other embodiments, the driver may provide a response by using a keyboard, touching a touch screen, or via other methods.

Figure 6:
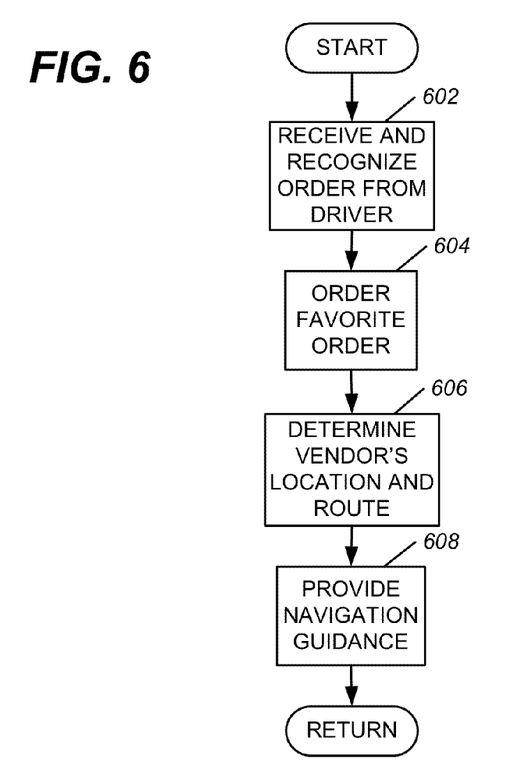
FIG. 6 is a flowchart of an exemplary process for an in-vehicle system to receive and recognize an order from a driver, place the order, and provide navigation guidance to a location of a vendor.

FIG. 6 is a flowchart illustrating an exemplary process, which may be implemented in various embodiments, for the driver to place an order with a vendor. The process may begin with speech recognition component 310 receiving and recognizing a speech utterance, including an order and vendor information, from the driver (act 602). In some embodiments, the driver may depress a talk switch to indicate a desire to speak a command and, as a result, in-vehicle system 102 may indicate readiness to input a speech utterance by making a sound, such as, for example, a beep, a generated voice, a recorded voice, or other sound.

Conversation initiator 306 may then place an order with a vendor, based on the order and the vendor information included in the recognized speech utterance (act 604). In some embodiments, in-vehicle system 102 may place the order by transmitting the order, via short rage transceiver 304, to communication device 104. Communication device 104 may then transmit the order to a computing device of the vendor from among computing devices 108 via network 106, which may include a wireless data network, for communication devices. The wireless data network may be connected to one or more other networks. In other embodiments, communication interface 212 may include a transceiver for communicating via the wireless data network directly, instead of communicating through communication device 104 to the wireless data network.

Next, navigation component 312 may determine a location of the vendor and a route to the vendor (act 606). Location information of the vendor may be included in the vendor information, or, in some embodiments, navigation component 312 may determine a nearest location of the vendor.

Navigation component 312 may then provide navigation guidance to the driver for driving to the location of the vendor (act 608). The process may then be completed.

Figure 7:
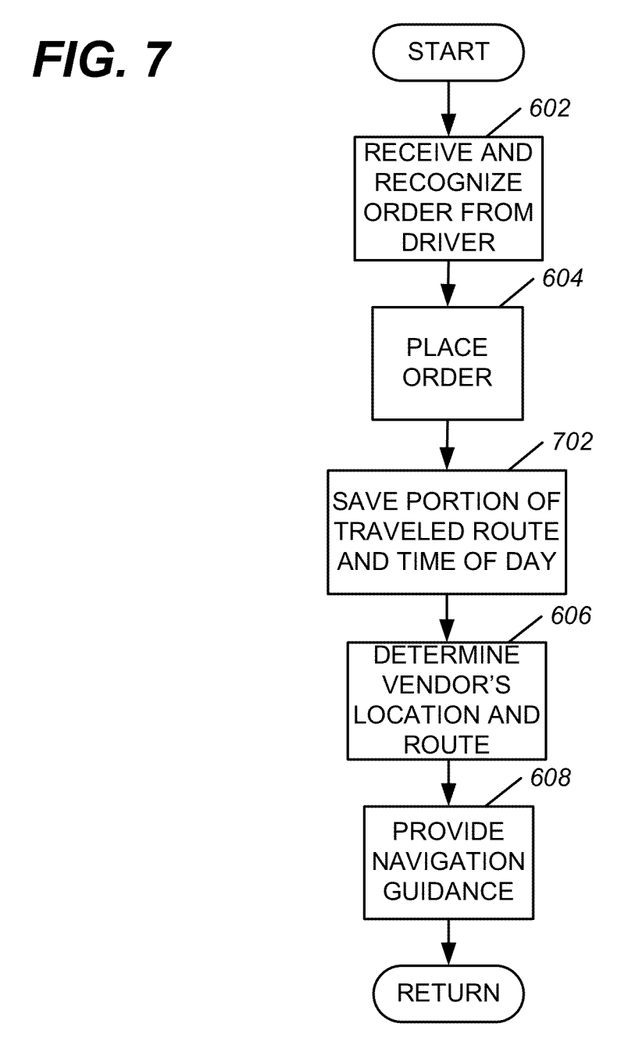
FIG. 7 is a flowchart of a modified version of the process illustrated in FIG. 6.

FIG. 7 is a modified version of the process of FIG. 6, which may be implemented in some embodiments. Those portions of the process having identical reference numerals to portions of the process of FIG. 6 are the same as the processes of FIG. 6. After in-vehicle system 102 places the order, in act 604, route monitor 308 may save a portion of a traveled route of the vehicle up until the order is placed, may obtain a current time of day from time monitor 314, and may save the current time of day associated with the saved portion of the traveled route of the vehicle (act 702). The process may continue with acts 606-608, as previously described with respect to FIG. 6.

In some embodiments, during act 702, route monitor 308 may save the portion of the traveled route and the associated time of day only when the order was placed a preset number of times within a preset period of time while traveling along the current route during a time of day that is within a predefined time period of a time of day when the vehicle was traveling along the current route and the order was placed. The preset number of times may be two times, five times, seven times, or another suitable number of times. The preset period of time may be one week, 2 weeks, four weeks, one month, or another suitable period of time.

Figure 8:
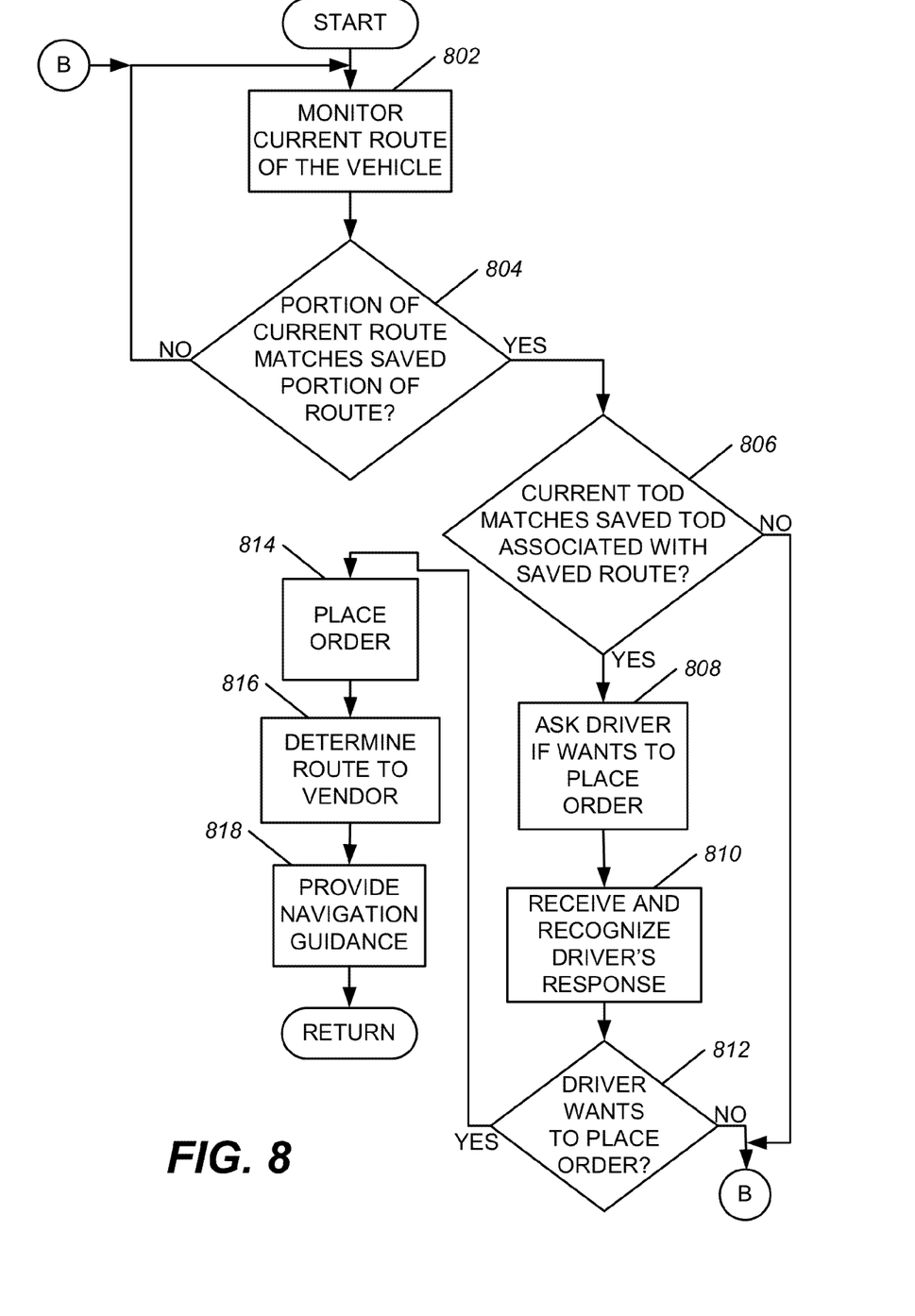
FIG. 8 is a flowchart illustrating an exemplary process, which may be performed in embodiments of an in-vehicle system that also perform the process of FIG. 7.

FIG. 8 is a flowchart of an exemplary process that may be performed in an embodiment that also performs the process of FIG. 7. The process may begin with route monitor 308 monitoring a current route of the vehicle (act 802). Route monitor 308 may determine whether a portion of the current route matches a portion of a saved route, which may have been saved during act 702 of FIG. 7 (act 804). If route monitor 308 determines that the portion of the current route does not match the portion of the saved route, then route monitor 308 continues monitoring the route (act 802).

Otherwise, if route monitor 308 determines that the portion of the current route does match the portion of the saved route, then route monitor 308 may obtain a current time of day from time monitor 314 and may compare the current time of day with a time of day associated with the portion of the saved route within a predefined time period (act 806). The predefined time period may be five minutes, 10 minutes, 30 minutes, or another suitable time period. If the current time of day does not match the time of day associated with the portion of the saved route within the predefined time period, then route monitor 308 may continue monitoring the route (act 802).

Otherwise, if route monitor 308 determines that the current time of day matches the time of day associated with the portion of the saved route within the predefined time period, then conversation initiator 306 may initiate a speech conversation with the driver to ask the driver if the driver desires to place an order (act 808). In some embodiments, the order may be an order that was previously placed while traveling along the portion of the saved route. Speech recognition component 310 may receive a speech utterance from the driver and may recognize the speech utterance (act 810). Conversation initiator 306 may then determine whether the driver indicated the desire to place the order by the received speech utterance (act 812). If the driver indicated no desire to place the order, then route monitor 308 may continue to monitor the current route of the vehicle (act 802).

Otherwise, if the driver indicated the desire to place the order during act 812, then in-vehicle system 102 may place the order by transmitting the order, via short rage transceiver 304, to communication device 104 (act 814). Communication device 104 may then transmit the order to a computing device of the vendor from among computing devices 108 via network 106, which may include a wireless data network, for communication devices. The wireless data network may be connected to one or more other networks.

In other embodiments, communication interface 212 may include a transceiver for communicating via the wireless data network directly, instead of communicating through communication device 104 to the wireless data network.

Navigation component 312 may then determine a route from the current location to a location of the vendor (act 816). In some embodiments, the vendor may be a vendor to which a previous order was placed when the vehicle was previously traveling along the portion of the saved route. Navigation component 312 may then provide navigation guidance to the driver for driving the vehicle to a location of the vendor (act 818). Route monitor may then continue monitoring the current route of the vehicle (act 802).

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims. One of ordinary skill in the art would understand that the specific acts described above may be performed in a different order than as described, or may be performed with fewer or additional acts.

Although the above descriptions may contain specific details, they are not to be construed as limiting the claims in any way. Other configurations of the described embodiments are part of the scope of this disclosure. Accordingly, the appended claims and their legal equivalents define the invention, rather than any specific examples given.

We claim as our invention:

1. A method for an in-vehicle system to initiate a conversation with a driver of a vehicle that includes the in-vehicle system, the method comprising:
   determining, by the in-vehicle system, whether a predefined favorite order of the driver exists and whether a current time of day is within a predefined time period of a predefined time of day;
   when the in-vehicle system determines that the predefined favorite order of the driver exists and the current time of day is within the predefined time period of the predefined time of day, performing:
      initiating, by the in-vehicle system, a speech conversation with the driver of a vehicle having the in-vehicle system to ask the driver whether the driver wants to order the predefined favorite order,
      receiving, by the in-vehicle system, a verbal response from the driver indicating whether the driver desires to order the favorite order, and
      when the verbal response of the driver indicates that the driver desires to order the predefined favorite order, performing:
         ordering, by the in-vehicle system, the predefined favorite order from a vendor, and
         providing navigation guidance to the driver for driving the vehicle to a location of the vendor;
   wherein the method further comprises:
      receiving, by the in-vehicle system via a second speech conversation with the driver, a second order from the driver, the second order including a second vendor from which the order is to be placed; and
      placing, by the in-vehicle system, the second order with the second vendor.

2. The method of claim 1, further comprising:
before ordering the predefined favorite order from the vendor, performing:
determining at least one vendor to which the favorite order can be placed,
asking the driver to select one of the at least one vendor from a list including the at least one vendor, and
receiving, responsive to the asking, the selected one of the at least one vendor as the vendor to which the favorite order will be placed.

3. The method of claim 1, wherein the vendor is predefined.

4. The method of claim 1 further comprising obtaining the predefined favorite order via a website.

5. The method of claim 1, further comprising:
monitoring, by the in-vehicle system, a route of the vehicle and an associated time of day;
saving, by the in-vehicle system, at least a portion of the route of the vehicle and the associated time of day when the second order is placed;
when a portion of the current route of the vehicle matches the saved at least the portion of the route of the vehicle and the saved associated time of day matches a current time of day, associated with the portion of the current route of the vehicle, within a predefined time period, performing:
initiating, by the in-vehicle system, a third speech conversation with the driver to ask the driver whether the driver desires to place the second order again, and
placing, by the in-vehicle system, the second order again when the driver responds to the initiated third conversation by indicating the desire to place the second order again.

6. The method of claim 5, further comprising performing the initiating the third speech conversation and the placing the second order again only when the monitored portion of the current route of the vehicle matches a previously saved at least the portion of the route and the monitored current associated time of day matches a previously saved current associated time of day within a predefined time period, at least a preset number of times within a preset period of time.

7. An in-vehicle system comprising:
a transceiver for communicating with a communication device, the communication device being capable of communicating via at least one network;
a conversation initiator for initiating a speech conversation with a driver of a vehicle that includes the in-vehicle system;
a navigation component for tracking a route of the vehicle and for providing navigation guidance to the driver;
a speech recognition component for recognizing a speech utterance of the driver; and
a route monitor for monitoring a portion of a current route of the vehicle and an associated time of day, wherein:
the route monitor determines whether the monitored portion of the current route of the vehicle matches a previously monitored portion of a route of the vehicle before an order was placed with a vendor by the in-vehicle system and the monitored associated time of day matches, within a predefined timer period, a previously monitored time of day associated with the previously monitored portion of the route,
when the route monitor determines that the monitored portion of the current route of the vehicle matches the previously monitored portion of the route of the vehicle before the order was placed with the vendor by the in-vehicle system and the monitored associated time of day matches, within the predefined timer period, the previously monitored time of day associated with the previously monitored portion of the route:
the conversation initiator initiates the speech conversation with the driver of the vehicle to ask the driver whether the driver desires to place the order again with the vendor, and
the in-vehicle system places the order with the vendor again when the driver responds to the initiated speech conversation by indicating the desire to place the order again;
when the speech recognition component receives, from the driver, a second speech utterance including a second order and a second vendor from which the second order is to be placed:
the speech recognition component recognizes the second speech utterance including the second order and the second vendor; and
after the speech recognition component recognizes the second speech utterance, the transceiver contacts the second vendor by sending the second order to the second vender via a first wireless connection between the in-vehicle device and the communication device, which has a second wireless connection to a network.

8. The in-vehicle system of claim 7, wherein after the in-vehicle system places the order with the vendor, the navigation component provides navigation guidance for the driver to drive to a location of the vendor.

9. The in-vehicle system of claim 7, wherein the first wireless connection is a Bluetooth® connection.

10. An in-vehicle system comprising:
a transceiver for communicating with a communication device, the communication device being capable of communicating via at least one network;
a conversation initiator for initiating a speech conversation with a driver of a vehicle that includes the in-vehicle system;
a navigation component for tracking a route of the vehicle and for providing navigation guidance to the driver;
a time monitor for monitoring a current time of day;
a speech recognition component for recognizing a speech utterance of the driver; and
a route monitor for monitoring a portion of a current route of the vehicle and an associated time of day, wherein:
the route monitor determines whether the monitored portion of the current route of the vehicle matches a previously monitored portion of a route of the vehicle before an order was placed with a vendor by the in-vehicle system and the monitored associated time of day matches, within a predefined timer period, a previously monitored time of day associated with the previously monitored portion of the route,
when the route monitor determines that the monitored portion of the current route of the vehicle matches the previously monitored portion of the route of the vehicle before the order was placed with the vendor by the in-vehicle system and the monitored associated time of day matches, within the predefined timer period, the previously monitored time of day associated with the previously monitored portion of the route:
the conversation initiator initiates the speech conversation with the driver of the vehicle to ask the driver whether the driver desires to place the order again with the vendor, and the in-vehicle system places the order with the vendor again when the driver responds to the initiated speech conversation by indicating the desire to place the order again;

when a favorite order is predefined, an associated vendor is predefined, and a predefined time to order is predefined:
the time monitor determines whether the current time of day is within the predefined time period of the predefined time to order, and
when the time monitor determines that the current time of day is within the predefined time period of the predefined time to order:
the conversation initiator initiates a second speech conversation with the driver of the vehicle to ask the driver whether the driver desires to place the favorite order again with the associated vendor,
the speech recognition component recognizes a second utterance of the driver in response to the conversation initiator initiating the second conversation to ask the driver whether the driver desires to place the favorite order, and
the in-vehicle system places the favorite order with the associated vendor when the driver responds to the initiated speech conversation by indicating the desire to place the favorite order.

11. The in-vehicle system of claim 9, wherein after the in-vehicle system places the favorite order, the navigation component automatically provides navigation guidance to the driver to drive to a location of the associated vendor.

12. An in-vehicle system comprising:
at least one processor; and
a memory communicatively attached to the at least one processor, the memory including instructions for the at least one processor to perform a method, the method comprising:
determining, by the in-vehicle system, whether a predefined favorite order of the driver exists and whether a current time of day is within a predefined time period of a predefined time of day;
when the in-vehicle system determines that the predefined favorite order of the driver exists and the current time of day is within the predefined time period of the predefined time of day, performing:
initiating, by the in-vehicle system, a speech conversation with the driver of a vehicle having the in-vehicle system to ask the driver whether the driver wants to order the predefined favorite order,
receiving, by the in-vehicle system, a verbal response from the driver indicating whether the driver desires to order the predefined order, and
when the verbal response of the driver indicates that the driver desires to order the predefined favorite order, performing:
ordering, by the in-vehicle system, the predefined favorite order from a vendor;
wherein the method further comprises:
receiving, by the in-vehicle system via a second speech conversation with the driver, a second order from the driver, the second order including a second vendor from which the order is to be placed; and
placing, by the in-vehicle system, the second order with the second vendor.

13. The in-vehicle system of claim 12, wherein the method further comprises automatically providing navigation guidance to the driver for driving the vehicle to a location of the vendor after performing the ordering the predefined favorite order from the vendor.

14. The in-vehicle system of claim 12, wherein the method further comprises:
before ordering the predefined favorite order from the vendor, performing:
determining at least one vendor to which the favorite order can be placed, asking the driver to select one of the at least one vendor from a list including the at least one vendor, and
receiving the selected one of the at least one vendor as the vendor to which the favorite order will be placed.

15. The in-vehicle system of claim 12, wherein the vendor is predefined and the method further comprises
obtaining, by the in-vehicle system, the predefined vendor via a website.

16. The in-vehicle system of claim 15, wherein the method further comprises obtaining, by the in-vehicle system, the predefined favorite order via the website.

17. The in-vehicle system of claim 12, wherein the method further comprises automatically providing navigation guidance for the driver to drive to a location of the second vendor.

* * * * *